United States Patent [19]
Buchwald et al.

[11] 3,950,985
[45] Apr. 20, 1976

[54] METHOD OF AND APPARATUS FOR MONITORING THE DURABILITY OF COMPONENTS OF THERMAL POWER PLANTS

[75] Inventors: Kurt Buchwald, Ilvesheim; Ludwig Busse, Leutershausen, both of Germany

[73] Assignee: BBC Brown Boveri & Company Limited, Baden, Switzerland

[22] Filed: Mar. 25, 1974

[21] Appl. No.: 454,366

[30] Foreign Application Priority Data
Mar. 26, 1973 Germany............................ 2314954

[52] U.S. Cl.................................. 73/116; 235/151.3
[51] Int. Cl.² ............................................ G01L 3/00
[58] Field of Search.................. 73/15.4, 116, 117.3; 235/151.2, 151.3, 183, 184

[56] References Cited
UNITED STATES PATENTS

| | | | |
|---|---|---|---|
| 3,250,901 | 5/1966 | Brahm .................................. | 73/154 |
| 3,357,239 | 12/1967 | Hohenberg ...................... | 235/150.2 |
| 3,517,177 | 6/1970 | Crowell................................. | 73/184 |
| 3,574,282 | 4/1971 | Curwen................................. | 73/116 |
| 3,584,507 | 6/1971 | Hohenberg .......................... | 73/116 |

*Primary Examiner*—Herbert Goldstein
*Attorney, Agent, or Firm*—Pierce, Scheffler & Parker

[57] ABSTRACT

A method for monitoring the durability i.e. the service life of components of a thermal plant where, in functional relation to thermal as well as mechanical stresses, hours eqivalent to those of actual operation of such component at a given correlated mechanical and thermal stress value are counted. The correlated mechanical and thermal stress generated within the component and simulated by an equivalent electrical signal such as a voltage, is compared with a stress, likewise simulated by an electrical signal which at the relevant temperature of the component corresponds to a constant service life assigned by design specification, and the difference between the two electrical signals thus produced is correlated in a non-linear manner to a factor by which the period of actual operation is weighted and integrated, thus arriving at equivalent hours of operation.

4 Claims, 4 Drawing Figures

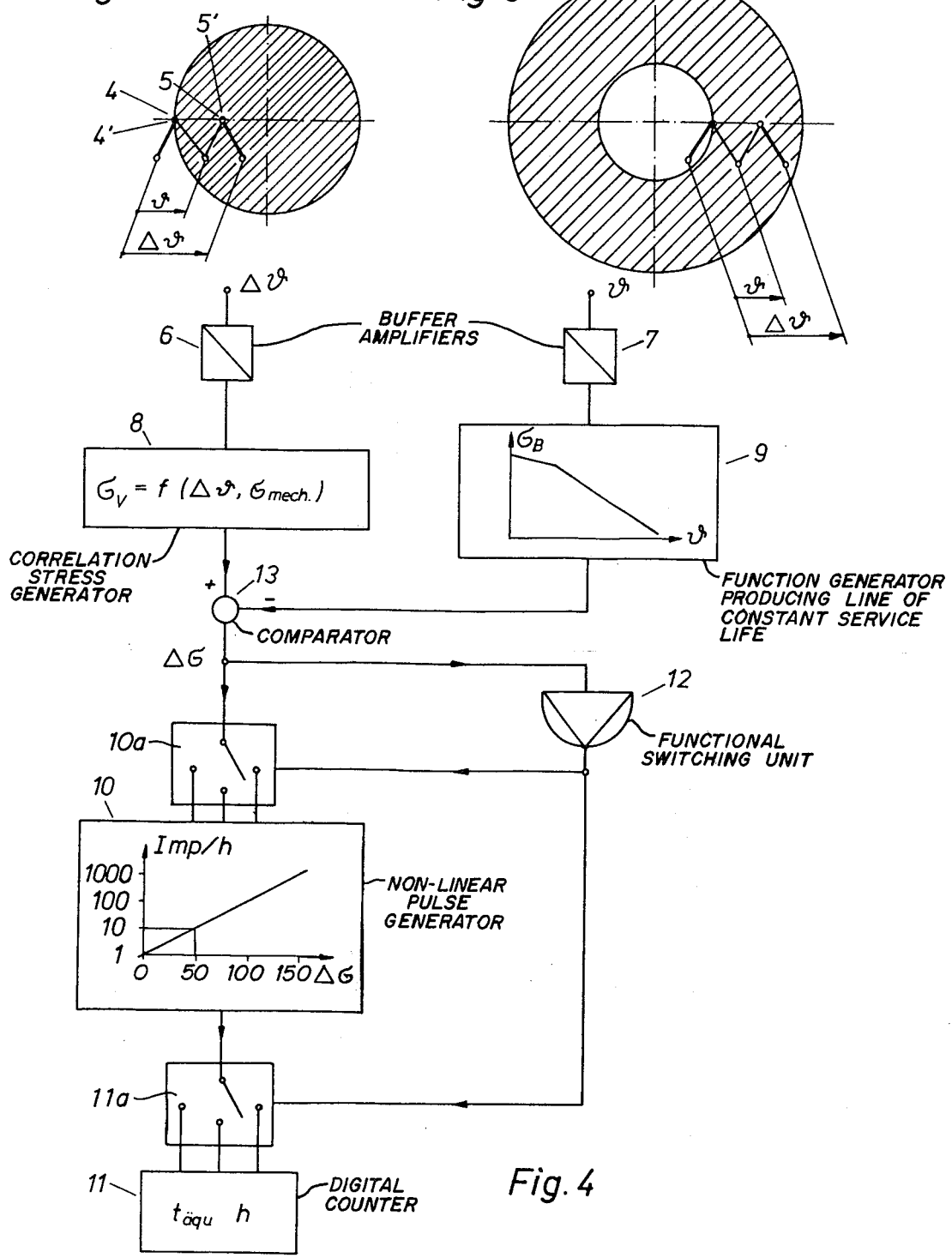

METHOD OF AND APPARATUS FOR MONITORING THE DURABILITY OF COMPONENTS OF THERMAL POWER PLANTS

BACKGROUND OF THE INVENTION

1. Field of the Invention

The present invention relates to an improved method for monitoring the durability i.e. service life of components of thermal power plants where equivalent hours of operation, in functional relation to thermal as well as mechanical influences, are counted. Equivalent hours of operation can be defined as the operating period which causes, relative to design characteristics, the same fatigue of material as the operating period actually performed, at the stresses which actually did arise during this period. The invention is further concerned with a novel apparatus by means of which the novel method can be performed.

Components of power plants to be monitored are primarily those parts of thermal machines and equipment which are subjected to fluctuating temperatures as well as high and varying stresses while they are operating.

Highly stressed structural members of thermal machines and equipment, for example of steam turbines, gas turbines and steam boilers, as well as components of power plants, such as pipes, manifold collectors and armatures, are designed for a specific operating period, based on the occurring stresses which are continuous. Assuming an ideal, stable operation at constant stress or load and at constant temperature, the continuous stress can be correlated with a planned service life which can be selected from the service life graph of the material being used.

Higher stresses and higher temperatures will reduce the service life correspondingly. When loads are changing, especially during starts and shut-downs of the thermal power plants, additional stresses are created by the one-sided heating or cooling of the components, thereby reducing their service life. However, in the case of installations which are operated under primarily stable conditions, as in the case of base-load power plants, it will be possible to make proper provisions for transitory higher stresses by addition of a safety factor when designing the lay-out, if the transient peak loads are kept within specific, pre-determined limits. It is for this purpose that devices heretofore proposed, for example in German patent applications published, DAS 1,401,453 and DAS 1,698,476 serve to detect and limit the transient peak load, namely by measuring continuously the load and comparing it with a temperature-related, maximum allowable load.

In the case of medium load installations, and especially in the case of peak load power plants which are started and shut down daily, the layout design on the basis of stable operating characteristics and with wide margins for safety becomes uneconomical and unreliable, because it is difficult to predict the life of the components which are subjected to the greatest stresses under changing operating conditions.

Devices have been developed for power plants (jet engines), as disclosed for example in U.S. Pat. No. 3,237,448, to measure and register the service life of a component subjected to high temperatures by counting equivalent hours of operation. However, power plants for aircraft differ from stationary power plants because of their thin-walled constructions which are necessary in order to attain a necessarily desirable low ratio of weight to power. Therefore, rotors and housing will heat up quickly and additional thermal stresses will not be generated for longer periods of time as is the case of the solidly constructed stable, stationary power plants.

Also known is a method to determine the permissible total hours of operation of thermal machines in functional relation to operating conditions, as disclosed for example in Swiss Pat. No. 416,190, where hours of operation are counted and multiplied continuously by a factor which is a function of the prevailing plant conditions. This factor can be a function of a temperature. The factor can also be a function of several parameters, for example a function of temperature combined with that of the rotary speed of a machine; however this Swiss patent is silent concerning the manner of detecting and processing such additional factors.

Finally, there is known an electrical measuring circuit for monitoring the service life of steam boilers and high-pressure steam pipes, using a device at the component to be monitored which measures the temperature of the steam, reference being made to German published Pat. application DAS 1,243,208, wherein one electrical quantity, representing a first measured quantity, steam temperature or steam pressure, energizes an impedance network with at least one resistor, its resistance decreasing, in a substantially exponential manner, with the electrical quantity, and where the output of the network activates an electrical counter, whereby at least one resistor of the network is varied in accordance with a second measured quantity, steam pressure or steam temperature.

2. Description of the Invention

The present invention is based primarily on the state of the art as disclosed by the above-mentioned Swiss Pat. No. 416,190. The principal objective of the invention is to establish an improved method for monitoring the service life of components of thermal power plants, especially to make feasible also a precise detection of the intermittent thermal stresses, generated in metals during the heating-up or cooling-off process, stresses which will occur primarily in connection with changes in load, or starting conditions.

The improved method, and the apparatus to be used for its practical application, should make it possible to take into account, in addition to the thermal stresses mentioned above, other influences which may occur under various operating conditions and which might affect the service life of components, such as purely mechanical stresses which will occur, for example due to centrifugal forces or internal pressure. Obviously, the influence of the temperature level at which the machine, or component to be monitored, is being operated, should always be taken into consideration when the service life is being ascertained. Thus, it is a primary objective of the invention to provide a novel method, and apparatus which will improve the monitoring systems heretofore proposed, thereby making possible a more reliable determination, or monitoring respectively, of the service life of components in thermal power plants.

SUMMARY OF THE INVENTION

The invention solves the problem of monitoring thermal power plants to determine component service life wherein equivalent hours of operations are counted in functional relation to thermal and mechanical influences in such manner that a mechanical stress generated within a critical component is compared with a stress which, at the relevant temperature of the critical components, corresponds to a constant service life assigned by design specifications, namely by simulating the mechanical comparison stress and the stress at constant service life by electrical voltages, their difference being correlated non-linearly to a factor, by which the period of actual operations is weighted and integrated, thus arriving at equivalent hours of operations.

The novel apparatus for practical application of the novel method proposed by the invention comprises thermo-couples which are arranged at the component to be monitored in such manner that these elements will measure the temperature of the critical fiber of the component, as well as the temperature difference representative of the thermal stress, and also buffer amplifiers which will feed the measured values in the form of electrical signals to an electronic function generator in order to simulate a graph of constant service life, and to establish the stress corresponding to the service life at the temperature measured, or to an electronic device, respectively for the computation of the mechanical comparison stress, whereby the difference in the output voltages of these devices will control a non-linear pulse generator this generator driving a counter that registers the accumulated equivalent hours of operation.

Thus, the invention makes feasible a measuring, as well as a registration of equivalent periods of operation in functional relation to stress and temperature.

BRIEF DESCRIPTION OF THE DRAWINGS

In the accompanying drawings which illustrate the invention by way of typical practical examples:

FIG. 2 depicts, in a schematic manner, an arrangement of the thermo-couples used in connection with the apparatus proposed by the invention, employing as an example a rotor heated from the outside, such as the rotor of a steam turbine, FIG. 3 shows, in diagrammatic form, an arrangement of the thermo-couples in the case of a turbine housing or a pipe which are heated from the inside, and FIG. 4 illustrates a schematic wiring lay-out for the apparatus proposed by the invention.

DESCRIPTION OF THE PREFERRED EMBODIMENTS

Figure 1:
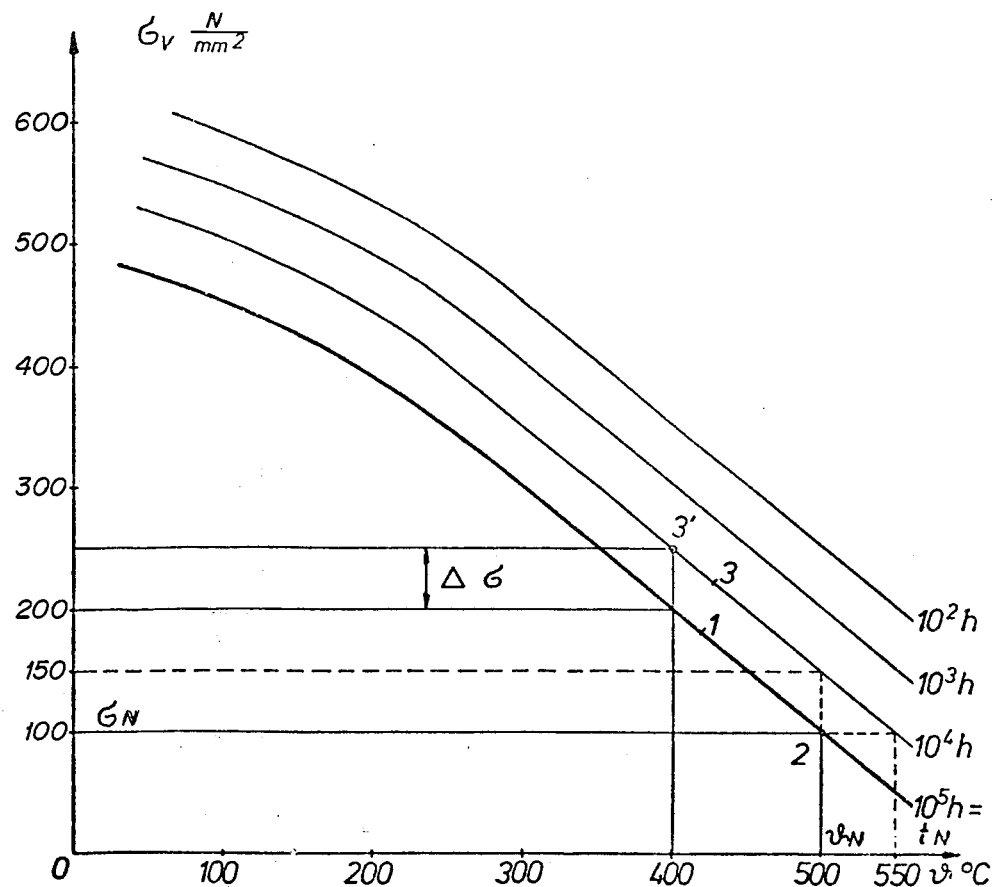
FIG. 1 illustrates a service life graph.

In the service life graph of FIG. 1 there is plotted the stress $\sigma_v$ (N/mm²) in functional relation to the temperature $\theta$ in ° centigrade, with the break-down time (life) used as a parameter. This diagram demonstrates that a component which, for example, is designed for stresses of 100 N/mm² and 500°C, will have a life expectancy of 100,000 hours according to the service life graph, see design point 2 at reference line 1. However, if the component is subjected during operations to stresses of 100 N/mm² and 550°C, it will last only for 10,000 hours. Likewise, it will last for only 10,000 hours at a higher stesss level of 150 N/mm² and a design temperature of 500°C. Thus, 10,000 hours at 100 N/mm² and 550°C, or 10,000 hours at 150 N/mm² and 500°C are equivalent to 100,000 hours at 100 N/mm² and 500°C. In the example given, the period of actual use at over-stress will result in the same fatigue of material as a ten-fold period of actual use at rated stress. That is to say, a multiplication of the actual use period by a factor of 10 will result in the equivalent hours of operations relative to the design characteristics.

These statements are correct and valid only for static stress and stable temperature, the premises which were used for plotting of the service life graphs. For varying stresses at high temperature ranges there will apply generally Miner's hypothesis of linear accumulation of damages, assuming that the number of stress cycles and stress amplitudes caused thereby will not result in a preponderant destructive damage. According to Miner's principle, the strain caused by stress and temperature will first affect the rate of fatigue of the material and subsequently lead after integration throughout the time of duration of the strain to actual fatigue, or consumption of service life, respectively, and finally to break-down of the critical component involved. This principle is expressed by the formula:

$$\int_o^t dt/t\,(\sigma, \theta) = 1$$

wherein:

$t\,(\sigma,\theta)$ represents the service life at stable stress $\sigma$ and temperature $\theta$, and $1/t\,(\sigma, \theta)$ the rate of fatigue.

If the service life at design stress $\sigma_N$ and design temperature $\theta_N$ is denoted by $t_N$, the accumulated equivalent operating time under varying operational conditions $\sigma$, $\theta$ can be computed in accordance with the formula:

$$t_{equ} = \int_o^t \frac{t_N}{t\,(\sigma, \theta)} dt$$

According to Miner's principle, the life-time of the component will come to an end when $t_{equ} = t_N$. Thus, according to the formula, the periods of time must be weighted, or multiplied by a factor related to the specific strain (temperature and stress) and added, respectively. The differentiation, based on the invention and explained below, as well as the circuitry, which will produce the specific factor, differ in principle from all other known attempts of a solution as represented by Swiss Pat. No. 416,190 and U.S. Pat. No. 3,237,448.

The concept which forms the basis for the invention, is explained by means of the modified service life graph of FIG. 1, where the lines depicting constant service life are plotted in functional relation to stress ($\sigma$) and temperature ($\theta$).

At reference line 1 there is shown specifically the design point 2. All points of a specific line of constant service life, for example of line 3, result in an identical factor, namely $t_N/t\,(\sigma,\theta)$, and an identical rate of fatigue. The lines representing constant service life for ferritic thermostable steels run nearly parallel within the critical temperature range, so that to the difference $\Delta\sigma$ between the present stress $\sigma$ and the stress plotted at reference line 1 at present operating temperature $\theta$ non-linearly there is assigned a factor $t_N/t\,(\sigma, \theta)$. In the specific case illustrated (point 3' at the selected line 3) the difference $\Delta\sigma = 50$ N/mm² amounts precisely to one decade of the service lives, and the factor $t_N/t\,(\sigma, \theta) = 10$. The parallel run of the lines of constant service life will make feasible a particularly simple technical reproduction of said factor.

Peaks of thermal stresses will generally occur within the surfaces of the components during the heating-up or cooling-off periods. FIGS. 2 to 4 show schematically the apparatus proposed by the invention to count the equivalent hours of operations of a component, using as examples: a rotor heated from the outside as in FIG. 2; a turbine housing heated from the inside, or a pipe heated from the inside as in FIG. 3. The thermal stresses which are present within the surface are detected by means of the temperature difference $\Delta\theta$ which exists between the surface 4 and the neutral fiber 5 because this temperature difference is a gage for the thermal stresses generated thereby. For example, the three thermal stress components which are present within the surface of a long turbine solid-rotor, in tangential, radial and axial directions are computed in accordance with $$\sigma t_\theta = \sigma_\theta$$
$$\sigma r_\theta = 0$$
$$\sigma a_\theta = \sigma_\theta$$

where $$\sigma_\theta = \frac{E\beta}{1-\gamma}\Delta\theta$$

in which
E = coefficient of elasticity
$\beta$ = mean coefficient of heat expansion
$\gamma$ = Poisson's ratio If a direct temperature measurement of the turbine rotor is not feasible due to inaccesibility, the flow of heat within the rotor can be simulated by means of a test probe in accordance with the German published Pat. application DAS 1,698,476, or reproduced by an electronic circuit arrangement.

The thermo-couples 4' measures the existing surface temperature $\theta$ which exists at the point 4, while the thermo-couples 5' records the temperature at the neutral fiber 5. The two thermo-couples are counter-connected in such manner that they will provide a direct measurement of the temperature difference $\Delta\theta$ between the surface at point 4 and the neutral fiber at point 5. The electrical signals $\Delta\theta$ and $\theta$ are fed by way of buffer amplifiers 6 and 7 free from reflection into the service life counter. A pipe or a turbine housing must absorb, in addition to thermal internal stresses, a heavy internal pressure, and the rotor of a turbine must additionally absorb stresses caused by centrifugal forces. A combination of all stress components will result in the correlation stress $$\sigma_\gamma = f(\Delta\theta, \sigma_{mech.})$$

which is generated by the electronic device 8, wherein:
$\Delta\theta$ represents a measurement for the thermal load, or thermal stresses respectively, and
$\sigma_{mech.}$ the additional mechanical stresses, caused for example by centrifugal forces or internal pressure.

The additional mechanical stresses ($\sigma_{mech.}$) can be fed into the electronic device 8 either as constant or as variable factors.

To give an example, the total state of stress within the long solid rotor of a turbine is generated by the superimposing of the stresses caused by pressures and centrifugal forces with the thermal stresses $$\sigma_t = -p + \sigma_\omega + \sigma_\theta$$
$$\sigma_r = -p$$

$$\sigma_a = -\frac{\gamma}{1-2\gamma}\sigma_\omega + \sigma_\theta$$

with $p$ = pressure $$\sigma_\omega = \frac{1-2\gamma}{4(1-\gamma)}\rho\omega^2 r^2$$

where:
$\rho$ = mass
$\omega$ = angular velocity
$r$ = radius of rotor

From the three primary stress components, the correlation stress cna be computed with the aid of the shape change energy according to the hypothesis by Mises $$\sigma_\gamma = \frac{1}{\sqrt{2}}\sqrt{(\sigma_t-\sigma_r)^2+(\sigma_r-\sigma_a)^2+(\sigma_a-\sigma_t)^2}$$

$$= \frac{E\beta}{1-\gamma}\sqrt{\Delta\theta^2 + A\Delta\theta + B}$$

where:

$$A = \frac{(1-\gamma)^2}{E\beta}\left[\frac{1-3\gamma}{1-2\gamma}\sigma_\omega + p\right]$$

$$B = \left(\frac{1-\gamma}{E\beta}\right)^2\left[\frac{1-3\gamma(1-\gamma)}{(1-2\gamma)^2}\sigma_\omega^2 + p^2 - \frac{1}{1-2\gamma}p\sigma_\omega\right]$$

wherein:
$p$ = pressure
$\sigma_\omega$ = centrifugal force

Turbines which are used for generation of electricity run at a constant speed of operation. The mechanical stress is influenced by the pressure only slightly and it thus becomes possible to assign, with close approximation, a value as the maean constant pressure. Under these stipulations, the factors A and B in the above equations will be constant, and the electronic device 8, used for squaring, adding and root extraction can be designed in a very simple manner. If the values for $\omega$ and $p$ are variable, the correlation stress can be established by the use of a suitable computer set-up according to the present state of the art. In lieu of a direct pressure measurement, it is also possible to utilize the turbine load P, i.e. p = a constant . P as factor.

The reference line of constant service life 1, which contains also the design point 2, see FIG. 1, can be produced by an electronic function generator 9 which, in accordance with FIGS. 2 to 4 is controlled by the surface temperature $\theta$, as exists at point 4. Thus, the output signal of the function generator 9 represents the measurement for the stress $\sigma_\beta$ assigned to the reference line 1 at a presently existing temperature $\theta$. The output signal of device 8 is compared with this value and the difference $\Delta\sigma = \sigma_\gamma - \sigma_\beta$ is formed at 13. This difference $\Delta\sigma$ or the corresponding electrical signal respectively, drives a non-linear pulse generator 10 which will accomplish the integration of the weighted periods of operation. At standard operation, i.e. when $\Delta\sigma = 0$, the pulse generator 10 is set at 1 pulse per hour so that each pulse signifies the termination of one equivalent hour of operation. However, if a difference $\Delta\sigma$ arises, for example if $\Delta\sigma = 50$ N/mm², which according to FIG. 1 would correspond to point 3' at line 3 with $\theta = 400°C$, the pulse generator 10 will run faster, i.e. deliver more pulses per hour, and in the case of the example of point 3', ten pulses per hour. The pulse generator 10 will therefore vary non-linearly the number of pulses per time unit according to the difference $\Delta\sigma$, and at a ratio which conforms with the service life graphs of FIG. 1. The digital counter 11 which follows the pulse generator in the circuit records cumulatively the equivalent hours of operation, thus delivering the desired indication concerning the progress of fatigue of the component being examined.

As shown in FIG. 4, pulse generator 10 is provided with several selectable inputs at an input selector 10a, three such inputs being illustrated, and the counter 11 connected to the output from pulse generator 10 has the same number of selectable inputs at an input selector 11a. A switching device 12 receives as a control input the difference signal $\Delta\sigma$ and provides a corresponding output which operates to correspondingly switch correlated inputs of the pulse generator and counter as a function of its amplitude to the end that the pulse generator 10 is always operated within a working range of 10 pulses per hour where its accuracy for the lower capacity is at a maximum. At the same time, the output from pulse generator 10 is switched over to the corresponding decade of counter 11 at the input selector 11a.

We claim:

1. A method for monitoring the service life of components of a thermal power plant by counting hours equivalent to those of actual operation of the component at a given correlated mechanical and thermal stress value which comprises the steps of
    a. determining from a constant service life graph the effect of a change in stress for a given temperature relative to a reference service life,
    b. measuring the temperature of the component,
    c. determining from the measured temperature the corresponding stress which would give the reference service life,
    d. measuring the temperature difference between two points in the component corresponding to the thermal stress,
    e. calculating from the measured temperature difference and known essential mechanical parameters of operation a correlated stress,
    f. comparing the respective stress values produced by steps c) and e) to
    g. the difference therebetween, determining from said stress difference and from the effect of the change in stress produced by step a) a weighted factor,
    h. utilizing said weighted factor to modify the actual measured time, and
    i. integrating said modified measured time to provide an equivalent time which corresponds to the hours equivalent of that portion of useful life which has been consumed relative to said reference service life.

2. The method as defined in claim 1 wherein the reference service life plotted as a function of temperature is represented by the stress of constant service life based on the design characteristic of the thermal power plant.

3. The method as defined in claim 1 wherein the component of the thermal power plant being monitored is the rotor element of a turbine and wherein the mechanical parameters of operation involved in calculation of said correlation stress are pressure and centifugal force.

4. Apparatus for monitoring the service life of components of a thermal power plant by counting hours equivalent to those of actual operation of the component at a given correlated mechanical and thermal stress value comprising:
    a first thermo-responsive element which measures the temperature at a point on the surface of the component under examination,
    means connecting the output from said first thermo-responsive element to an electronic function generator through a first buffer amplifier, said function generator producing at its output a first signal representative of a stress for that temperature corresponding to a designed reference service life,
    a second thermo-responsive element which measures the temperature at a point internally of said component and which is counter-connected with said first thermo-responsive element so as to produce a direct measurement of the temperature difference between said points and which is representative of the thermal stress,
    means connecting the temperature difference output signal from said counter-connected first and second thermo-responsive elements to an electronic device through a second buffer amplifier, said device combining said temperature difference signal with a known mechanical stress factor to produce at its output a second signal,
    means for comparing said first and second signals to produce a signal corresponding to the difference therebetween,
    a pulse generator driven by said difference signal $\Delta\sigma$ and which produces pulses at a repetition rate proportional to a base frequency $f_o$ when $\Delta\sigma=0$ and which produces pulses at a repetition rate proportional to $$10^{\frac{\Delta\sigma}{K}} f_o$$

when $\Delta\sigma$ is not equal to zero, wherein K represents the stress difference corresponding to one decade of service life, and
    a counter driven by the output from said pulse generator which totalizes the pulses which represents the equivalent hours of operation of the component relative to the designed reference service life.

\* \* \* \* \*

UNITED STATES PATENT OFFICE
CERTIFICATE OF CORRECTION

PATENT NO. : 3,950,985
DATED : April 20, 1976
INVENTOR(S) : KURT BUCHWALD and LUDWIG BUSSE It is certified that error appears in the above-identified patent and that said Letters Patent are hereby corrected as shown below:

IN CLAIM 1:

line 2 of step (f.) after "to" insert:

the difference therebetween line 1 of step (g.) cancel "the difference therebetween"

Signed and Sealed this twenty-ninth Day of June 1976

[SEAL]

Attest:

RUTH C. MASON
*Attesting Officer*

C. MARSHALL DANN
*Commissioner of Patents and Trademarks*